Nov. 21, 1944.   A. F. JENKINS   2,363,250
TORCH TIP
Filed Sept. 25, 1942
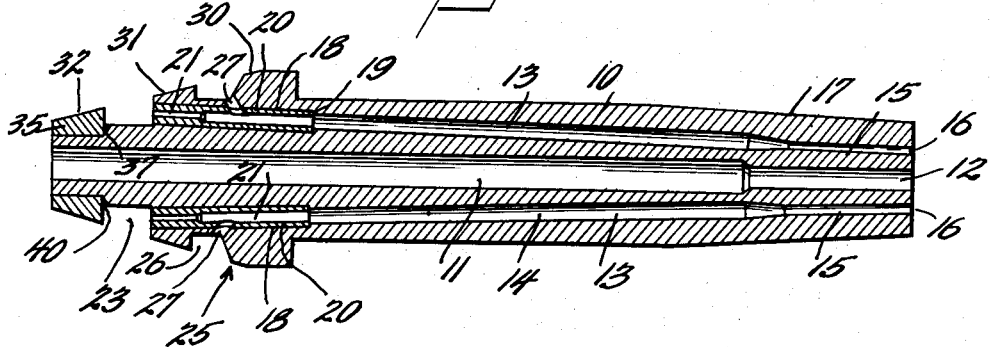
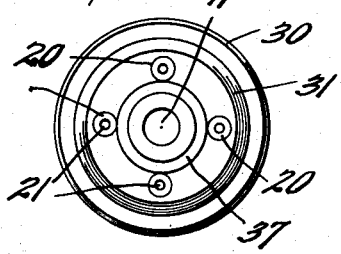
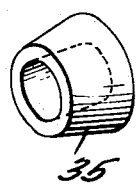
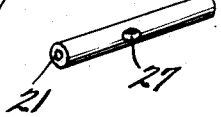
Inventor
Alexander F. Jenkins
By Watson, Cole, Grindle & Watson
Attorney Patented Nov. 21, 1944

2,363,250

UNITED STATES PATENT OFFICE 2,363,250

TORCH TIP

Alexander F. Jenkins, Baltimore, Md.

Application September 25, 1942, Serial No. 459,729

3 Claims. (Cl. 158—27.4)

This invention relates to blowpipes and more particularly to blowpipe or torch tips used in cutting and welding operations.

The general object of the invention is to provide a novel and improved torch tip embodying means for effectively controlling the flow of gases therethrough and thoroughly mixing them, the tip being of simple construction and especially easy to manufacture and assemble.

Although the invention in its broadest sense is applicable to a wide variety of blowpipe organizations, it will be described herein in connection with a cutting torch tip of the type which seats within a tapered or conical socket in the torch body, registering annular grooves being provided in the tip and in the socket for segregating and conducting the gases to the several ducts within the tip.

By gradual evolution, the development of cutting torch tips has attained a status where it is generally agreed that for most purposes these tips should comprise a central axial oxygen passageway about which are disposed a plurality of other passageways for mixed oxygen and combustible gas leading to separate orifices in the front end of the tip. It is necessary to thoroughly mix the combustible gas and oxygen in the proper proportions in these passageways which surround the central oxygen duct. Various proposals have been made for suitably arranging the tip to accomplish this purpose, most of them including the provision of an attenuated forward or delivery portion for each of such passageways, an intermediate expanded mixing portion within each passageway, and a narrow injector section at the rear or inlet end of the passageway. Various ways of carrying out this design have been proposed, some of which include drilling the narrow rear or inlet sections of the passageway in the body of the tip, drilling the wider passageway from the forward end of the tip rearwardly to the inlet passage, and swaging the forward end of the tip to partly close the forward or discharge portion of the passageway.

However, it has been found that better results are attained if the attenuated rear or inlet portions of the mixed gas passageways are formed of separate fine tubular inserts. These inserts are preferably made of a harder, finer grained metal than that of which the torch tip proper is made and one which is relatively non-corrosive and which may be machined smoothly without burring. These tips may be made of stainless steel, Monel metal, or of a baser or more common metal coated with a harder and smoother one, such as copper or bronze, electro-plated with chromium or the like.

In applying these inserts, difficulty has been encountered, especially in connection with the tapered socket type of tip, in accurately positioning the inserts without interference with other portions of the tip. One way of applying the inserts is to force them into the passageways from the forward end of the tip, before swaging. Another plan involves the provision of a two-part tip separated adjacent the intermediate portion, the two tip sections being threaded together, this enabling the tips to be inserted within the rear half of the tip before assembly.

However, there has been provided by the present invention a simple and inexpensive means for constructing the rear portion of a tip of this class whereby the inserts may be applied from the rear end of the tip with a minimum of alteration in the conventional construction. One of the tapered shouldered portions of the rear part of the torch tip is separable, is of annular construction, and is adapted to be fitted accurately around a shouldered portion of the tip proper to complete one of the annular gas grooves, after the inserts have been applied.

Other objects and features of novelty will be apparent from the following specification when read in connection with the accompanying drawing in which one embodiment of the invention is illustrated by way of example.

In the drawing,

Figure 1 is a longitudinal sectional view of a cutting torch tip embodying the principles of the invention;

Figure 2 is an end view of the tip with the annular shoulder flange at the end of the tip removed for application of the inserts;

Figure 3 is a view in perspective of the separable annular shoulder portion; and Figure 4 is a view in perspective of one of the mixing chamber inlet inserts.

The cutting torch tip 10, in general configuration, is of substantially conventional form. The elongated body of the tip 10 is provided with the central axial oxygen passageway 11 which is in communication at its rear end with a corresponding passageway in the torch body (not shown) and opens out through the tapered forward end of the tip in the oxygen orifice 12. Surrounding the central oxygen passageway or duct 11 are a plurality of mixed combustible gas and oxygen passageways 13, the intermediate portions 14 of which are somewhat enlarged to provide mixing chambers. The forward end portions of these passageways are attenuated as shown at 15 and open out through the front end of the tip in the gas orifices 16. The attenuated portions 15 may be formed in any suitable manner as for example by swaging the forward end of the tip as at 17 while preventing the complete closure of the passageways by the insertion of fine mandrels. The rear portions of the passageways 13 are of somewhat greater diameter than the intermediate mixing chambers 14 as indicated at 18. This provides a shoulder 19 against which the hard metal inserts 20 may abut. These inserts are provided with fine axial stepped passageways 21 which open at one end into the mixing chambers 14 and at the other end into the annular groove 23 which, when the tip is applied to the body of the torch, registers with an opening or another annular groove in the socket.

The rear end 25 of the tip, which is retained within the socket of the torch, is of a generally conical configuration and is provided with another annular groove 26 which registers with another gas orifice in the head. A fine passageway 27 is drilled through the tip body and through the wall of the insert 20 to carry the gas from the groove 26 to the interior passageway 21 of the insert for mixing with the gas introduced from the groove 23. For cutting work, the gas introduced through one of the grooves 23 or 26 is oxygen and the other is a combustible gas such as hydrogen or acetylene. The grooves 23 and 26 are isolated by the tapered shoulder portions 30, 31, and 32, the last named portion 32 being comprised by a separable annular collar member 35.

The rear end of the body of the tip 10 surrounding the inlet of the oxygen passageway 11 is turned down to a narrower external diameter than the bottom of the groove 23, and a shoulder 37 is produced at the junction of this narrowed portion and the groove. The externally tapered annular member 35 is internally drilled to fit the narrowed end of the tip snugly, the larger forward end element 35 abutting the shoulder 37 when in applied position. The inter-fitting parts are machined very accurately so that when applied the outer surface of the element 35 conforms to the conical configuration of the socket providing a continuation of the conical surfaces of the shoulders 30 and 31. The sleeve element 35 is securely retained in position by a ring of solder indicated at 40.

In assembling the tip the inserts 20 are applied and forced into place from the rear end, this being permitted by the absence of any obstruction in the form of a shouldered rear end portion of the tip. After the inserts have been forced into their proper positions against the shoulder 19 the annular element 35 is applied to the end of the tip, moved into place against the shoulder 37, and soldered firmly into fixed position.

It will be seen that by the present invention means have been provided for enabling the insertion of the attenuated tubular elements for introducing the gases into the cutting tips of this type, with a minimum of alteration of the unitary nature of the tip body while also enabling the application of the tubular inlet inserts from the rear end of the tip.

Various changes and modifications may be made in the embodiment illustrated and described herein without departing from the scope of the invention as defined by the following claims.

Having thus described the invention, what is claimed as new and desired to be secured by Letters Patent is:

1. A torch tip of the class described comprising a body portion having a passageway extending longitudinally therethrough and eccentrically thereof, an annular groove provided in the outer surface of the tip adjacent the rear end thereof, said passageway opening through one side wall of the groove, the opposite side wall of the groove being furnished by an annular sleeve fitted upon a rearwardly projecting part of the body portion of the tip which is of an external radius less than the radial distance of said passageway from the axis of the tip the external radius of said sleeve being greater than said radial distance.

2. A torch tip of the class described comprising a body having a plurality of passageways therethrough each disposed at the same radial distance from the axis of the tip, the tip proper having a stepped substantially cylindrical rearward projection formed thereon, the greatest radius of said projection being less than the radial distance from the passageways to the axis of the tip, tubular inlet elements inserted into the rear ends of the passageways, and an annular sleeve fitted to the smaller portion of the stepped projection of the tip and abutting a shoulder at the larger portion, whereby it is spaced from the end of the tip proper to provide an annular groove into which said passageways open, said sleeve having an outer radius larger than the radial distance between the passageways and the axis of the tip.

3. A cutting torch tip of the class described comprising a unitary body portion being substantially cylindrical throughout a large portion of its length but having a generally frusto-conical rear end adapted to fit a correspondingly formed torch socket, an annular groove in the outer surface of the frusto-conical end portion, and a stepped axial projection extending from the tip at its rear end and integral therewith, an axial oxygen passageway extending through the tip, and a series of gas passageways spaced radially of the axis of the tip and opening through the rear end surface of the body of the tip radially outwardly of the axial projection, an annular sleeve fitted fixedly upon said projection and spaced from the end of the tip body through which the gas passageways open to provide another annular groove, the outer surface of the sleeve being tapered to conform to the general conical configuration of the rear portion of the tip body, the outer radius of the sleeve being greater than the radial distances of the gas passageways from the axis of the tip.

ALEXANDER F. JENKINS.